Figure 1:
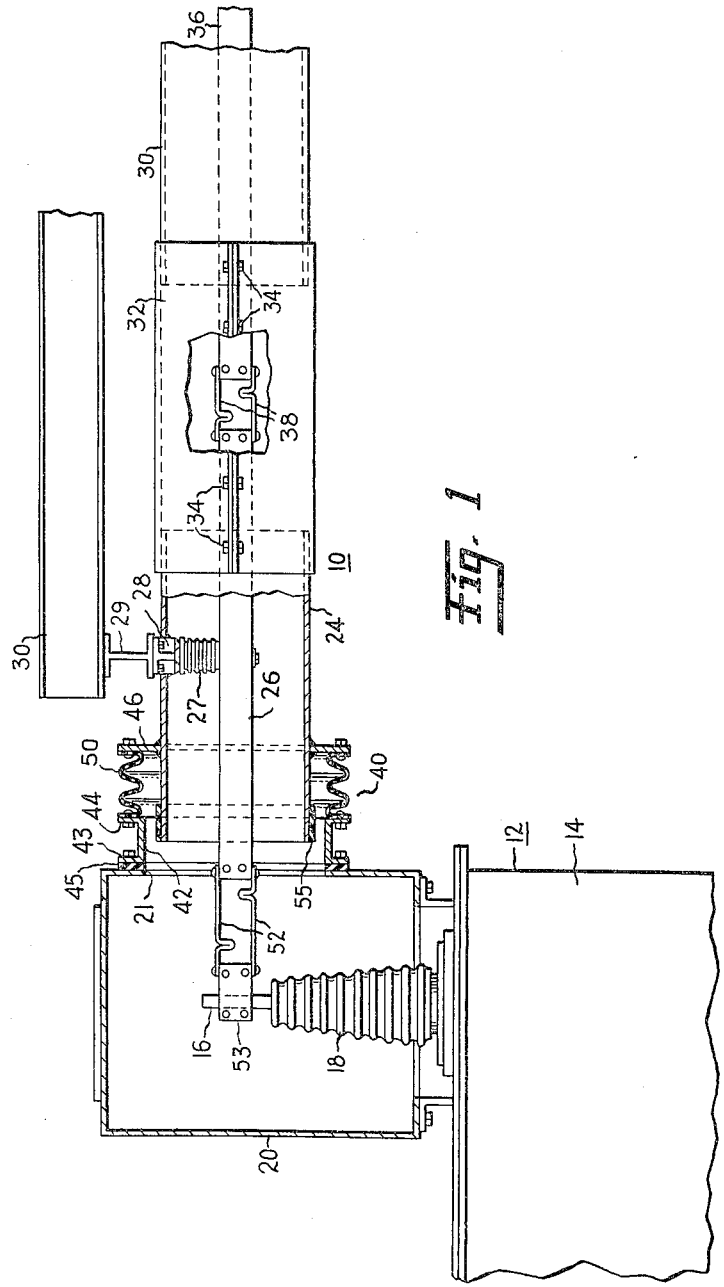

INVENTOR.
NATHAN SWERDLOW
BY William Freedman
ATTORNEY

United States Patent Office 3,036,148
Patented May 22, 1962

3,036,148
SEALED JOINT FOR INTERCONNECTING AN ELECTRIC BUS AND ASSOCIATED ELECTRIC APPARATUS
Nathan Swerdlow, Philadelphia, Pa., assignor to General Electric Company, a corporation of New York
Filed Nov. 9, 1959, Ser. No. 851,893
3 Claims. (Cl. 174—85)

This invention relates to a sealed joint for interconnecting an enclosed electric bus and electric apparatus connected to the bus. More particularly, the invention relates to a sealed joint of this type which is capable of accommodating limited movement of the bus in any direction relative to the connected apparatus.

To facilitate installation of an enclosed bus and to allow for subsequent shifts in alignment due to uneven foundation-settling and the like, it is desirable that the joint between the bus and its connected apparatus be capable of accommodating limited movement of the bus in any direction relative to the apparatus. Flexible joints capable of accommodating such universal movement have been provided heretofore but they have been subject to such disadvantages as being unduly expensive and complicated, being difficult to install in the field, being susceptible to damage as a result of an electrical fault occurring within the bus, or leaving the bus conductor exposed in the event of minor damage.

It is therefore an object of my invention to provide a simple and inexpensive flexible joint between a bus and its connected apparatus which can be easily installed in the field, is shielded from damage by arcing inside the bus, and does not leave the bus conductor exposed in the event of damage.

In carrying out my invention in one form I provide electric apparatus comprising a housing and a rigid terminal conductor insulated from said housing. Electrically connected to the terminal conductor is an enclosed bus comprising a metallic enclosure and a rigid bus conductor disposed within the enclosure and insulated from the enclosure. The terminal conductor and the bus conductor are electrically interconected by flexible means which allows for relative movement between the conductors and between the enclosure and the housing. A tubular ring is mounted on the housing and surrounds an end portion of the enclosure which is constituted by an integrally formed continuation of the remainder of the closure. The ring is mounted in spaced-apart relationship to the end portion of the enclosure about the entire perimeter of said end portion so as to allow for limited transverse and axial movement of the enclosure relative to the ring. A flexible boot of insulating material surrounding said end portion is secured between said ring and said enclosure to provide a seal between said ring and said enclosure.

For a better understanding of my invention, reference may be had to the following specification taken in conjunction with the accompanying drawing wherein:

The single figure is a side elevation view, partly in section, showing a sealed joint between an electric transformer and an electric bus embodying one form of my invention.

Referring now to the drawing, there is shown an enclosed bus 10 and electric apparatus, such as a transformer 12, to which the bus is connected. The transformer 12 comprises a grounded metallic housing 14 and a rigid terminal conductor 16 insulated from the metallic housing 12 by means of porcelain entrance bushing 18. The metallic housing 12 includes a metallic bushing-enclosure 20 which surrounds the bushing 18 and contains an opening 21 for receiving a conductor that supplies power to the terminal conductor 16. The bushing-enclosure 20 is at ground potential and is insulated from the terminal conductor 16.

The bus 10 comprises a tubular metallic enclosure 24 and a rigid bus conductor 26 disposed generally coaxially of the enclosure 24. The conductor 26 is supported within its enclosure by means including an insulating post 27, which serves to electrically insulate the bus conductor 26 from the enclosure. The insulating post 27 is mounted on a support 28 extending transversely of the enclosure 24 and suitably welded to the enclosure 24. This support 28 is bolted to a suitable transverse I-beam 29 which, in turn, is secured to the building steel 30. Since the support 28 is welded to the enclosure 24, it serves not only to support the conductor 26 but also to support the enclosure 24.

A metallic enclosure 30 similar to the enclosure 24 is mounted in axially spaced relationship to the enclosure 24, and a split cover 32 of tubular form embraces the adjacent ends of the two enclosures to enclose the gap between the enclosures. The split cover 32 is longitudinally split so that tightening of the bolts 34 causes the opposite halves of the cover 32 to tightly embrace the ends of the enclosures 24 and 30. The enclosure 30 encloses another rigid conductor 36, which is flexibly joined to the conductor 26 by means of suitable braids 38 electrically interconnecting the conductors 36 and 26. The split cover 32 allows for easy access to be had to the braids 38 and other internal parts of the bus.

To facilitate installation of the bus 10 and to allow for subsequent shifts in alignment of the bus 10 relative to the transformer 12, I have provided a joint 40 between the bus and the transformer which is capable of accommodating limited misalignment between the bus and the transformer housing portion 20 and also is capable of accommodating limited relative movement in all directions of the bus relative to the housing portion 20. This joint 40 comprises a channel-shaped ring 42 surrounding an end portion of the enclosure 24 and radially spaced about its entire circumference from this end portion so as to allow for limited transverse movement of the enclosure 24 relative to the ring 42. This ring 42 includes a pair of radially-outwardly extending flanges 43 and 44, the flange 43 being bolted to the housing portion 20 by means of a series of bolts circularly spaced about the ring 42. A suitable annular gasket 45 is disposed between this flange 43 and the housing portion 20 to provide a good seal between these parts. Axially spaced from the ring 42 is a radially-extending plate 46 welded to the enclosure 24. Secured between this plate 46 and the flange 44 ring 42 is a flexible, corrugated boot 50 of insulating materials that serves to seal the space between the ring 42 and the enclosure 24 against the entry of moisture or other foreign matter. One end flange of this tubular boot 50 is bolted to the flange 44 of ring 42, and the other end flange of the boot is bolted to the plate 46. Since this boot 50 is flexible, it does not interfere with movement of the enclosure 24 relative to the housing 20.

The rigid bus conductor 26 is electrically connected to the terminal 16 of the transformer by means including flexible conductive braids 52 and a conductive adapter 53 suitably clamped to the terminal conductor. The flexible braids not only allow for relative movement of the bus conductor 26 relative to the terminal conductor 16 but also allow for movement of the enclosure 24 relative to the housing 20 without interference from the conductors.

Referring to the drawing, it is to be noted that the bus enclosure 24 terminates short of the left hand end of the bus conductor 26 and that the flexible braids 52 are therefore located inside the housing 20 and outside of the bus enclosure 24. Since the clearances between the housing 20 and the conductor structure therein are larger than those available between the bus enclosure 24 and the conductor structure (due to the enlarged nature of the housing 20 and opening 21), some displacement of the flexible braids beyond the outer perimeter of the conductor 26 can be tolerated without detracting from the overall dielectric strength between the conductor structure 26, 52, 53 and the surrounding housing and enclosure.

It will be noted that the flexible boot 50 surrounds the end portion of the enclosure 24 so that this end portion is physically interposed between the conductor 26 and the boot 50. As a result, the boot 50 is protected from any arc which might develop between the conductor 26 and the enclosure 24 as a result of a phase-to-ground fault. The outer terminal of such an arc would be free to move past the joint 40 without coming into contact with the boot 50. Another advantage that results from locating the boot externally to the enclosure 24 is that mechanical damage to the boot, say from some external blow, would not leave the conductor exposed. The end portion of the enclosure 24 would still be present to prevent the conductor from being readily contacted from outside the bus.

It will be further noted that the end portion of the enclosure 24, i.e., the portion of the enclosure 24 surrounded by the ring 42 and the boot 50, is an integrally formed continuation of the remainder of the enclosure. This contributes to the low cost of my joint inasmuch as it eliminates the need for any special adaptor and securing means for the adaptor. The enclosure 24 can be simply a tube of generally uniform diameter and cross-section throughout its length.

By utilizing an outwardly-opening channel configuration for the ring 42, easy access may be had to the bolts used for securing the ring 42 to the housing 20 and to the boot 50. Use of this outwardly-opening channel configuration is also advantageous in eliminating the need for any special gasketing around the bolts inasmuch as any leakage of liquid around the bolts along their length would be external to the overall bus enclosure and would not result in entry of such liquid into the interior of the enclosure.

Because the flexible boot 50 is of insulating material, it is capable of electrically isolating the enclosure 24 from the housing 20. This isolation is desirable inasmuch as it precludes the flow of circulating currents between the enclosure 24 and laterally adjacent enclosures (not shown) via a path extending through the housing 20. A thin sleeve 55 of insulating material is preferably applied to the end portion of the enclosure 24 to prevent the insulating boot 50 from being conductively bridged by contact between the ring 42 and the enclosure 24 in the event of extreme misalignment between these parts. The fact that the boot 50 is of insulating material also precludes possibly-damaging eddy currents from being induced therein by current flowing through the main conductor 26.

My joint 40 is completely assembled in the factory except for the connection between the ring 42 and the housing 20. In other words, the parts 24 and 42—50 are shipped as a completely pre-assembled unit. All that is required for field installation is bolting the flange 43 of the ring 42 to the housing 20. This can be quickly done without the need for any precise alignment inasmuch as the flexible boot 50 and the space between the ring 42 and the enclosure 24 allow the ring 42 to be bolted into place without regard to the exact position of the enclosure 24.

While I have shown and described a particular embodiment of my invention, it will be obvious to those skilled in the art that various changes and modifications may be made without departing from my invention in its broader aspects. I, therefore, intend in the appended claims to cover all such changes and modifications as fall within the true spirit and scope of my invention.

What I claim as new and desire to secure by Letters Patent of the United States is:

1. In combination, electric apparatus comprising a housing and a rigid terminal conductor within said housing insulated from said housing, an enclosed bus comprising a tubular metallic enclosure and a rigid bus conductor disposed within said enclosure, flexible means located within said housing providing an electric connection between one end of said bus conductor and said terminal conductor and allowing relative movement between said conductors and between said enclosure and said housing, insulator means for supporting said bus conductor in spaced-apart relationship to said enclosure, a tubular ring mounted on said housing and surrounding an end portion of said enclosure, said ring being radially-spaced from said end portion about the entire perimeter of said end portion so as to provide clearance between said ring and end portion that allows for limited transverse and axial movement of said enclosure relative to said ring, said end portion of the enclosure being an integrally-formed continuation of the remainder of the enclosure terminating short of said one end of said bus conductor, annular structure welded to and surrounding said enclosure, and means including a flexible boot of insulating material surrounding said end portion of said enclosure and secured between said ring and said annular structure for providing a seal between said ring and said enclosure.

2. In combination, electric apparatus comprising a housing and a rigid terminal conductor insulated from said housing, an enclosed bus comprising a tubular metallic enclosure and a rigid bus conductor disposed within said enclosure, flexible means providing an electrical connection between said conductors and allowing for relative movement between said conductors and between said enclosure and said housing, insulator means for supporting said bus conductor in spaced-apart relationship to said enclosure, a tubular ring having a pair of axially-spaced radially-outwardly extending flanges, means for mounting said ring on said housing in a position to surround an end portion of said enclosure, said ring being radially spaced from said end portion about the entire perimeter of said end portion so as to provide clearance between said ring and said end portion that allows for limited transverse and axial movement of said enclosure relative to said ring, said end portion of the enclosure being an integrally-formed continuation of the remainder of the enclosure, a radially-extending plate welded to said enclosure and axially spaced from said ring, a generally cylindrical flexible boot of insulating material surrounding said enclosure and extending between said plate and one of the flanges of said ring, means for securing said boot to said plate and said flange for providing a seal between said ring and said enclosure, said securing means comprising fastening devices extending through said flange and a radially-outwardly extending end portion of said boot disposed outside of the space enclosed by said boot.

3. In combination, electric apparatus comprising a housing and a rigid terminal conductor within said housing insulated from said housing, an enclosed bus comprising a tubular metallic enclosure and a rigid bus conductor disposed within said enclosure, flexible means located within said housing providing an electric connection between one end of said bus conductor and said terminal conductor and allowing relative movement between said conductors and between said enclosure and said housing, insulator means for supporting said bus conductor in spaced-apart relationship to said enclosure, a tubular ring mounted on said housing and surrounding an end portion of said enclosure, said ring being radially-spaced from said end portion about the entire perimeter of said end portion so as to provide clearance between said ring and end portion that allows for limited transverse and axial movement of said enclosure relative to said ring, said end portion of the enclosure being an integrally-formed continuation of the remainder of the enclosure terminating short of said one end of said bus conductor, annular structure fixed to and surrounding said enclosure, means including a flexible boot of insulating material surrounding said end portion of said enclosure and secured between said ring and said annular structure for providing a seal between said ring and said enclosure, and means for precluding the flow of current between said ring and said enclosure even in the event of extreme misalignment of said ring and said enclosure comprising a thin sleeve of insulating material surrounding said end portion of said enclosure and normally spaced about its entire periphery from said ring.

References Cited in the file of this patent

UNITED STATES PATENTS

| | | |
|---|---|---|
| 1,720,586 | Allen et al. | July 9, 1929 |
| 2,470,989 | Keller et al. | May 24, 1949 |
| 2,892,012 | Swerdlow et al. | June 23, 1959 |